(12) United States Patent
Wardlaw

(10) Patent No.: US 11,277,977 B2
(45) Date of Patent: Mar. 22, 2022

(54) MULTI-TIERED PLANT GROWING AID AND METHODS OF USE THEREOF

(71) Applicant: Colonel Wardlaw, Detroit, MI (US)

(72) Inventor: Colonel Wardlaw, Detroit, MI (US)

(73) Assignee: Colonel Wardlaw, Troy, MI (US)

( * ) Notice: Subject to any disclaimer, the term of this patent is extended or adjusted under 35 U.S.C. 154(b) by 169 days.

(21) Appl. No.: 16/390,734

(22) Filed: Apr. 22, 2019

(65) Prior Publication Data
US 2020/0329644 A1 Oct. 22, 2020

(51) Int. Cl.
*A01G 9/12* (2006.01)
*A01G 17/04* (2006.01)

(52) U.S. Cl.
CPC .............. *A01G 9/12* (2013.01); *A01G 17/04* (2013.01)

(58) Field of Classification Search
CPC .......... A01G 9/023; A01G 9/12; A01G 17/06; A01G 9/124; A01G 17/04
See application file for complete search history.

(56) References Cited

U.S. PATENT DOCUMENTS

| | | | | |
|---|---|---|---|---|
| 1,843,366 A * | 2/1932 | Kreimer | ............... | A01G 9/12 47/47 |
| 2,530,015 A * | 11/1950 | Kouri | ............... | A01G 17/06 47/46 |
| 4,785,576 A * | 11/1988 | Morgan | ............... | A01G 17/06 135/118 |
| 4,922,653 A * | 5/1990 | Stone | ............... | A01G 17/04 47/45 |
| 7,219,467 B1 * | 5/2007 | Branman | ............... | A01G 9/12 47/45 |
| 7,984,585 B1 * | 7/2011 | Wu | ............... | A01G 9/12 47/58.1 R |
| 9,456,689 B1 * | 10/2016 | Tinsley | ............... | A01G 31/06 |
| 10,757,869 B1 * | 9/2020 | Yost | ............... | A01G 9/12 |
| 11,058,068 B1 * | 7/2021 | Gravel | ............... | A01G 9/12 |
| 2006/0272209 A1 * | 12/2006 | Hart | ............... | A01G 9/12 47/66.6 |
| 2011/0197505 A1 * | 8/2011 | Hansen | ............... | A01G 9/12 47/65.8 |
| 2012/0017501 A1 * | 1/2012 | Koopmeiners | ............... | A01G 9/12 47/45 |

(Continued)

FOREIGN PATENT DOCUMENTS

CN 106576987 A * 4/2017
CN 108029397 A * 5/2018
(Continued)

*Primary Examiner* — Magdalena Topolski
(74) *Attorney, Agent, or Firm* — Darrow Mustafa PC

(57) ABSTRACT

A multi-tiered plant growing aid includes a first frame and a plurality of base legs attached to the first frame such that the first frame is supported by and spaced apart from a base surface. A second frame is included, and a plurality of support legs are positioned between the first frame and the second frame such that the second frame is positioned parallel and spaced apart from the first frame. A first mesh panel is attached to the first frame and a second mesh panel is attached to the second frame such that the second mesh panel is positioned generally parallel to and spaced apart from the first mesh panel. The second frame has an outer dimension greater than an outer dimension of the first frame such that a plurality of cascading growing shelves is provided.

7 Claims, 9 Drawing Sheets

(56) References Cited

U.S. PATENT DOCUMENTS

Figure 1:
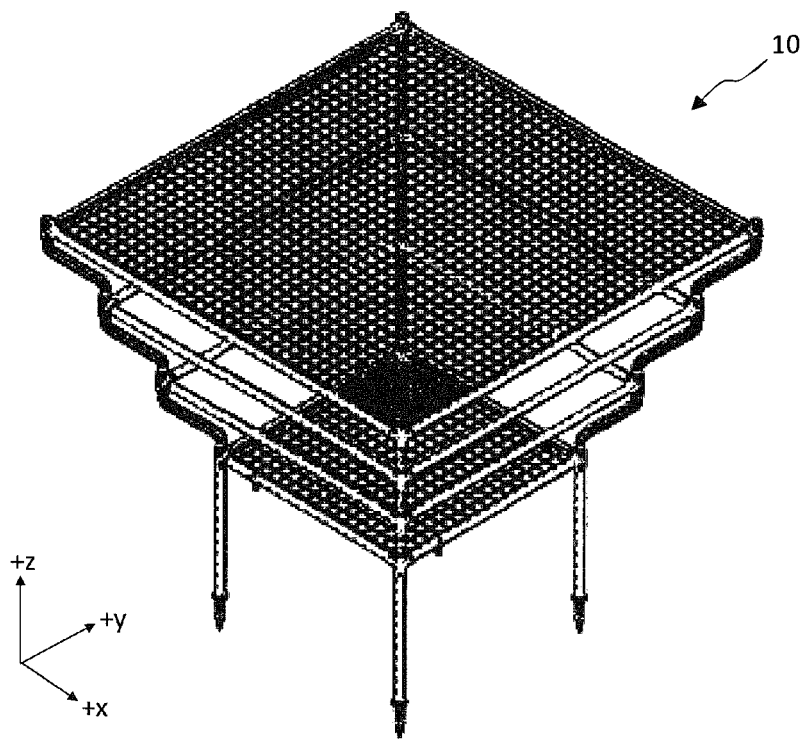

| | | | | |
|---|---|---|---|---|
| 2012/0204488 | A1* | 8/2012 | Anderson | A01G 9/12 |
| | | | | 47/66.6 |
| 2013/0145686 | A1* | 6/2013 | Dame | A01G 9/12 |
| | | | | 47/45 |
| 2014/0196365 | A1* | 7/2014 | Washington | A01G 9/02 |
| | | | | 47/66.6 |
| 2014/0305040 | A1* | 10/2014 | Hall | A47G 7/041 |
| | | | | 47/65.5 |
| 2016/0286733 | A1* | 10/2016 | Fair | A01G 22/00 |
| 2017/0112074 | A1* | 4/2017 | Mermelstein | A01G 9/02 |
| 2018/0007843 | A1* | 1/2018 | Fakhari | A01G 9/12 |
| 2018/0084737 | A1* | 3/2018 | Wills | A01G 9/122 |
| 2018/0359960 | A1* | 12/2018 | MacDonald | A01G 9/12 |
| 2020/0015431 | A1* | 1/2020 | Kirk | A01G 9/12 |
| 2020/0146223 | A1* | 5/2020 | Ahl | A01G 22/05 |
| 2020/0205352 | A1* | 7/2020 | Riggs | A01G 9/12 |
| 2020/0275614 | A1* | 9/2020 | McKibben | A01G 13/10 |

FOREIGN PATENT DOCUMENTS

| | | | | | |
|---|---|---|---|---|---|
| CN | 109328751 | A | * | 2/2019 | |
| CN | 111011051 | A | * | 4/2020 | |
| DE | 202011003592 | U1 | * | 10/2011 | A01G 17/04 |
| DE | 202017004120 | U1 | * | 8/2017 | A01G 9/12 |
| FR | 2143545 | A1 | * | 2/1973 | E01F 8/027 |
| FR | 2730379 | A1 | * | 8/1996 | A01G 9/12 |
| GB | 1452430 | A | * | 10/1976 | A01G 13/043 |
| KR | 20090001613 | U | * | 2/2009 | |
| KR | 20140017722 | A | * | 2/2014 | |

* cited by examiner

MULTI-TIERED PLANT GROWING AID AND METHODS OF USE THEREOF

FIELD

The present disclosure relates to plant growing aids and particularly to multi-tiered plant growing aids.

BACKGROUND

The statements in this section merely provide background information related to the present disclosure and may not constitute prior art.

The use of poles, wire fences, and trellises to aid in plant growth in known. For example, vine like plants such as pole beans, vine tomatoes, morning glories, clematis and the like are grown by allowing or training the stems of the plant(s) to intertwine or attach to structures as the plant grows. The structures keep the growing plant off of the ground and can assist in harvesting produce from the plant and typically support or aid in a single layer of vertical plant growth which can limit the amount of plant growth and/or the amount of produce harvested from the plant.

The present disclosure addresses the issues of limited plant growth and limited plant harvesting, among other issues related to plant growth.

SUMMARY

This section provides a general summary of the disclosure and is not a comprehensive disclosure of its full scope or all of its features.

In one form of the present disclosure, a multi-tiered plant growing aid includes a base frame and a plurality of base legs attached to the base frame such that the base frame is supported by and spaced apart from a base surface. At least one additional frame is included, and a plurality of support legs are positioned between the base frame and the at least one additional frame such that the at least one additional frame is positioned parallel and spaced apart from the base frame. In some aspects of the present disclosure, the plurality of support legs is a plurality of S-shaped support legs. A base mesh panel is attached to the base frame and at least one additional mesh panel is attached to the at least one additional frame such that the at least one additional mesh panel is positioned parallel and spaced from the base mesh panel. In some aspects of the present disclosure, the at least one additional frame has an outer dimension greater than an outer dimension of the base frame and the at least one additional mesh panel has an outer dimension greater than an outer dimension of the base mesh panel. In such aspects, the base mesh panel and the at least one additional mesh panel form a plurality of cascading mesh panels with increasing outer dimensions as a function of distance from the base surface.

In some aspects of the present disclosure, a plurality of couplings is positioned between and releasably attached to the base frame and the plurality of base legs. In such aspects, the plurality of couplings can include a first set of couplings positioned between and releasably attached to the base frame and the plurality of base legs and a second set of couplings positioned between and releasably attached to the plurality of support legs and the at least one additional frame.

In some aspects of the present disclosure, a plurality of mesh panel clips is included, and the plurality of mesh panel clips releasably attach the base mesh panel to the base frame and the at least one additional mesh panel to the at least one additional frame. In some aspects a plurality of stakes is included and extend from a lower end of the plurality of base legs such that the base legs and the multi-tiered plant growing aid are attached to the base surface.

In another form of the present disclosure, a kit of parts for a multi-tiered plant growing aid includes a base frame and a plurality of base legs attachable to the base frame such that the base frame is supported by and spaced apart from a base surface by the plurality of base legs. At least one additional frame and a plurality of support legs attachable to the base frame are included. Each of the plurality of support legs is configured to attach to the base frame and the at least one additional frame such that the at least one additional frame is positioned parallel to and spaced apart from the base frame. A base mesh panel and at least one additional mesh panel are included. The base mesh panel is configured to attach to the base panel and the at least one additional mesh panel is configured to attach to the at least one additional frame such that the at least one additional mesh panel is positioned parallel to and spaced apart from the base mesh panel.

In some aspects of the present disclosure a first set of tubes connectable together to form the base frame and a second set of tubes connectable together to form the at least one additional frame are included. In such aspects, a first set of couplings and a second set of couples can be included. The first set of couplings are configured to couple the first set of tubes together to form the base frame and the second set of couplings are configured to connect the second set of tubes together to form the at least one additional frame. Also, the first set of couplings can be configured to connect the plurality of support legs to the base frame and the second set of couplings can be configured to connect the plurality of support legs to the at least one additional frame. In some aspects of the present disclosure, a first set of mesh panel clips configured to attach the base mesh panel to the base frame and a second set of mesh panel clips configured to attach the at least one additional mesh panel to the at least one additional frame are included. Also, a plurality of stakes configured to attach to and extend from a lower end of the plurality of base frame legs can be included.

In still another form of the present disclosure, a method for growing a plant includes assembling a first set of tubes and forming a first frame and assembling a second set of tubes and forming a second frame. A plurality of base legs are attached to the first frame such that the first frame is supported by and spaced apart from a support surface by the plurality of base legs and a plurality of support legs is attached to the first frame and to the second frame such that second frame is secured and positioned a predefined distance from the first frame. In some aspects of the present disclosure, an outer dimension of the second frame is greater than an outer dimension of the first frame such that a plurality of cascading frames is provided. A first mesh panel is attached to the first frame and a second mesh panel is attached to the second frame such that the second mesh panel is secured and spaced apart from the first mesh panel. A plant grows vertically through the first mesh panel and at least one of a stem and a first set of branches of the plant is intertwined with the first mesh panel such that the plant grows laterally along the first mesh panel. Also, the stem of the plant grows vertically through the second mesh panel and at least one of the stem and a second set of branches of the plant is intertwined with the second mesh panel such that the plant grows laterally along the second mesh panel.

In some aspects of the present disclosure, the method includes assembling a third set of tubes and forming a third frame, attaching a plurality of support legs to the second frame and to the third frame such that the third frame is secured and positioned a predefined distance from the second fame. In such aspects, a third mesh panel is attached to the third frame such that the third mesh panel is secured and positioned a predetermined distance from the second mesh panel. In some aspects the third frame is greater than an outer dimension of the second frame such that three cascading frames is provided. The stem of the plant grows vertically through the third mesh panel and at least one of the stem and a third set of branches of the plant is intertwined with the third mesh panel such that the plant grows laterally along the third mesh panel. In some aspects of the present disclosure, the method includes attaching a first harvesting shelf to the first frame and harvesting a portion of the plant growing and intertwined with the first mesh panel in the first harvesting shelf. Also, a second harvesting frame can be attached to the second frame and a portion of the plant growing and intertwined with the second mesh panel is harvested in the second harvesting shelf. In some aspects a third harvesting frame is attached to the third frame and a portion of the plant growing and intertwined with the third mesh panel is harvested in the third harvesting shelf. In some aspects of the present disclosure, an outer dimension of the second harvesting shelf is greater than an outer dimension of the first harvesting shelf and an outer dimension of the third harvesting shelf is greater than an outer dimension of the second harvesting shelf.

Further areas of applicability will become apparent from the description provided herein. It should be understood that the description and specific examples are intended for purposes of illustration only and are not intended to limit the scope of the present disclosure.

DRAWINGS

Figure 2:
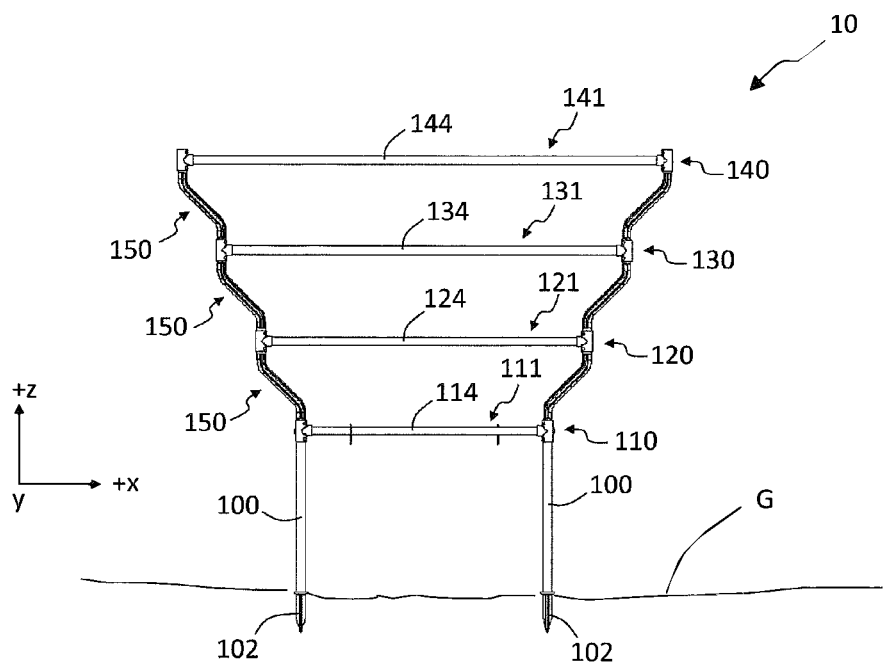
Figure 3:
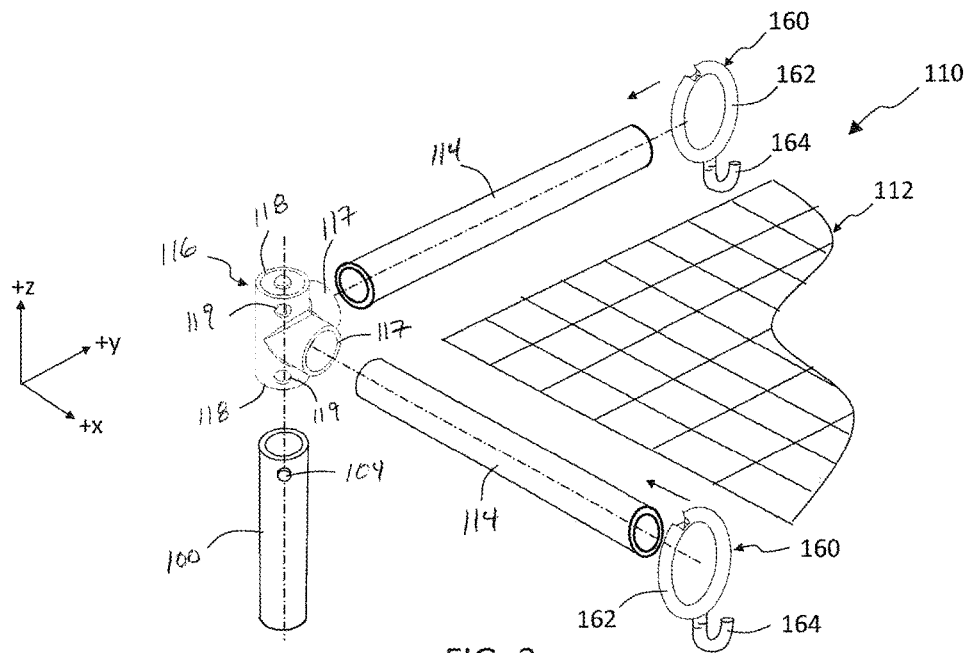
Figure 4:
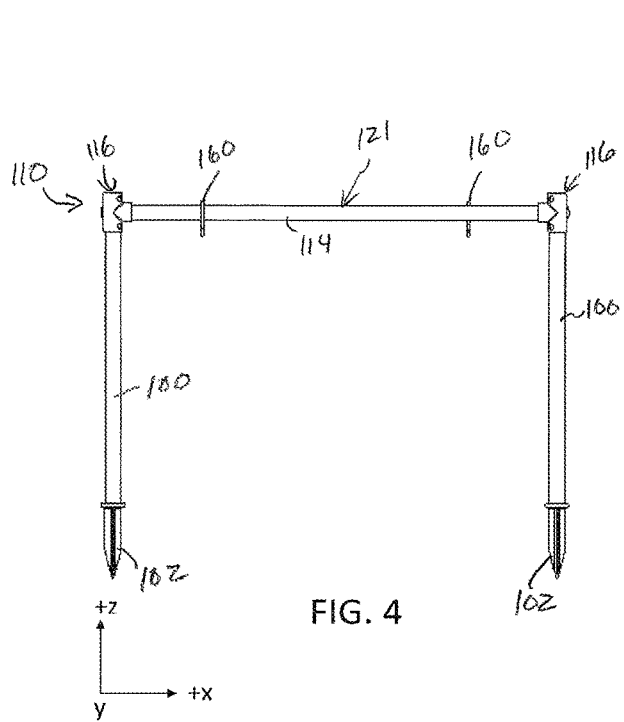
Figure 5:
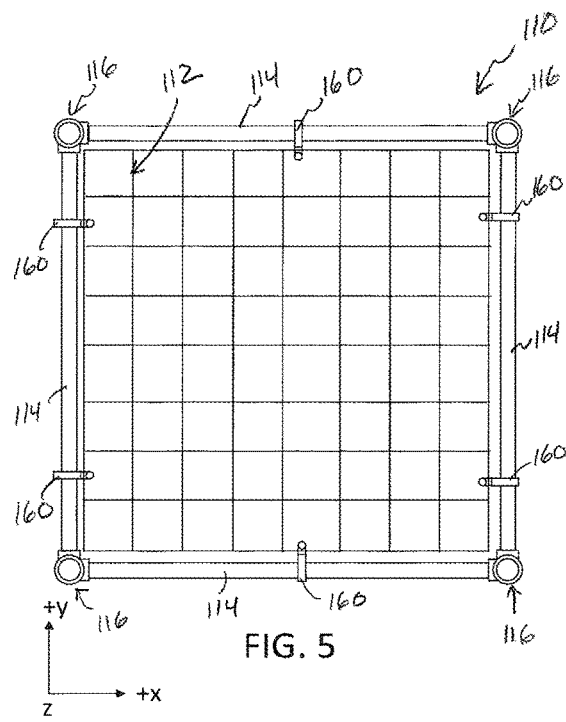
Figure 6:
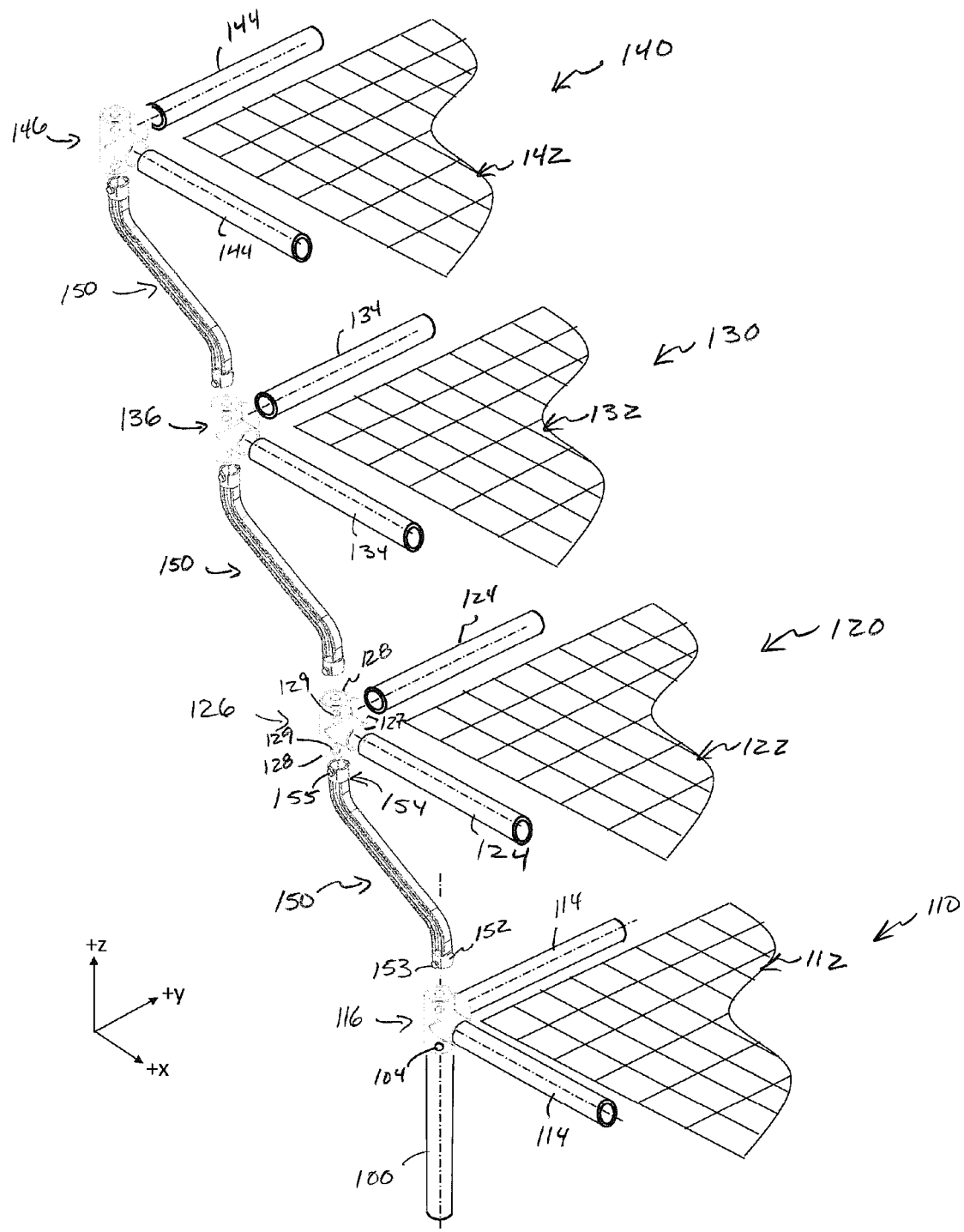
Figure 7:
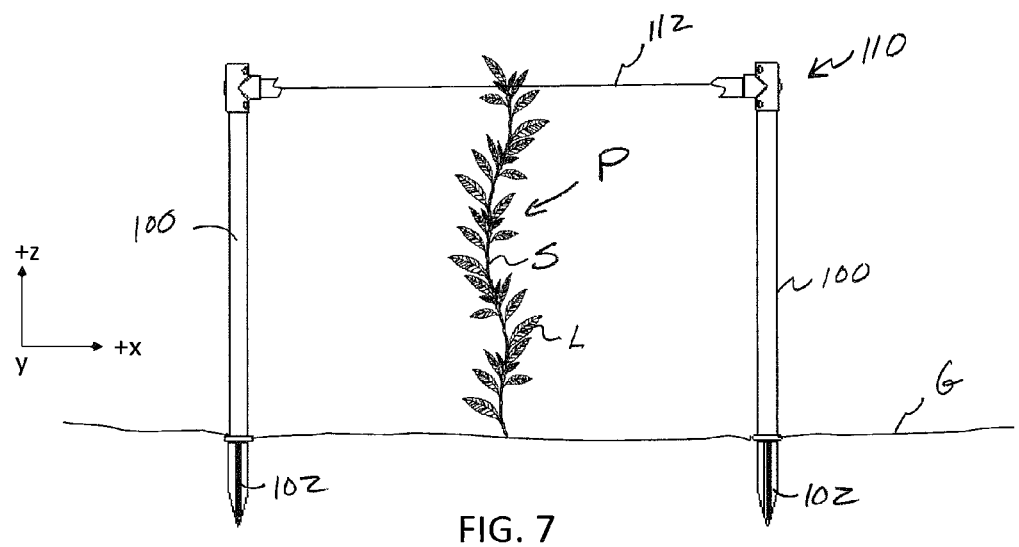
Figure 8:
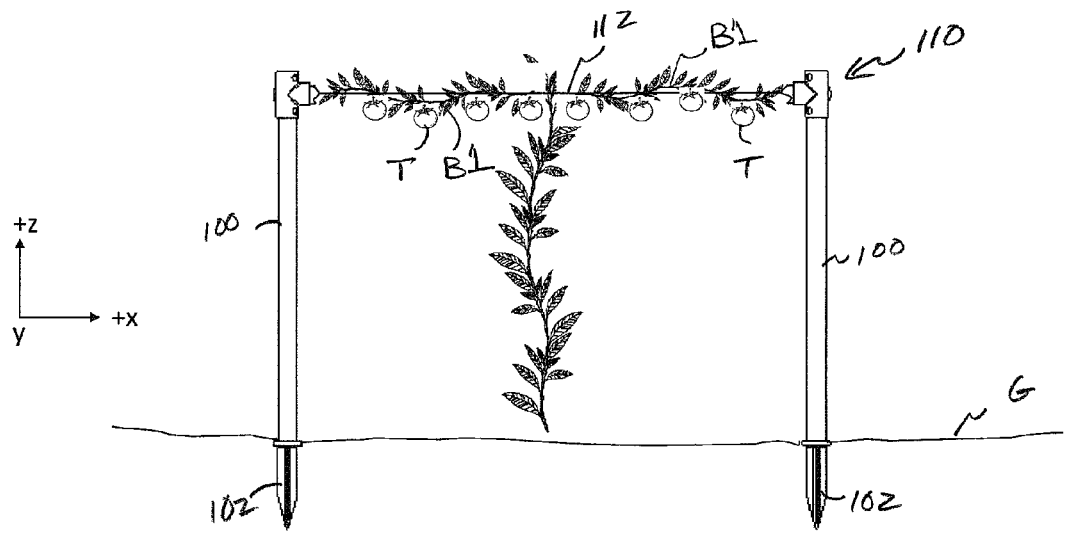
Figure 9:
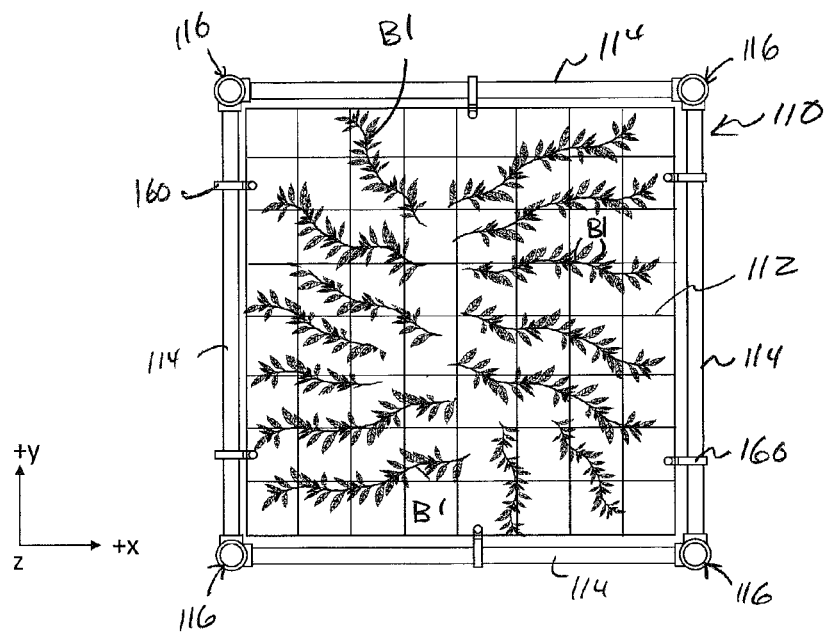
Figure 10:
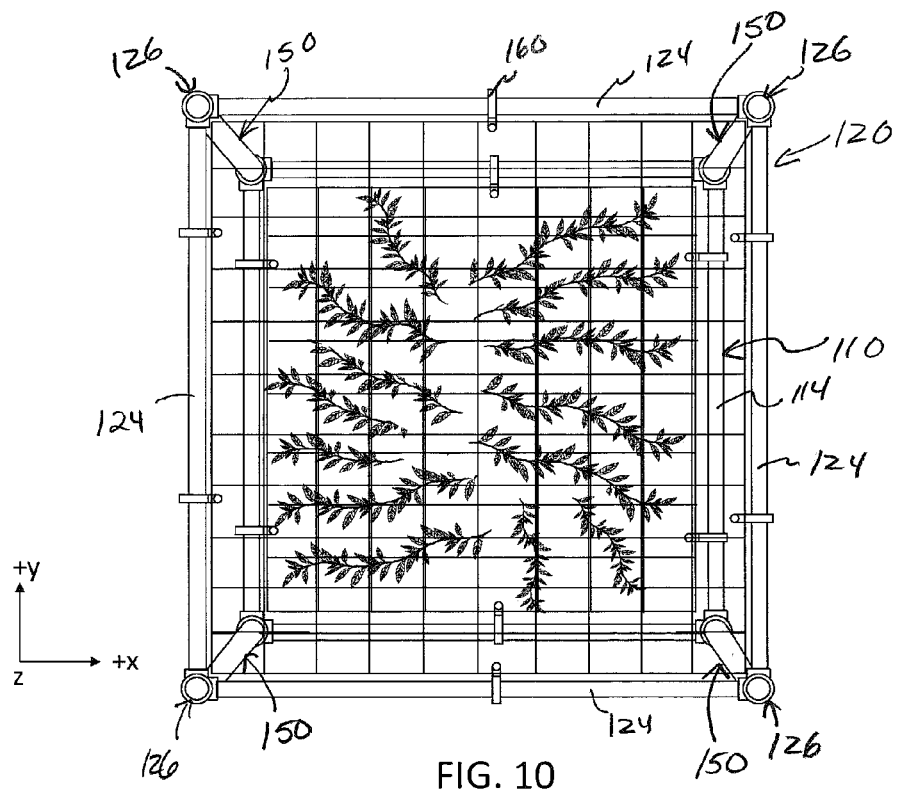
Figure 11:
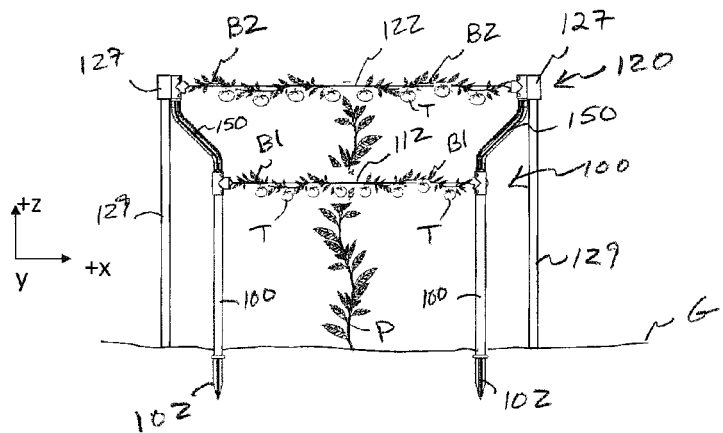
Figure 12:
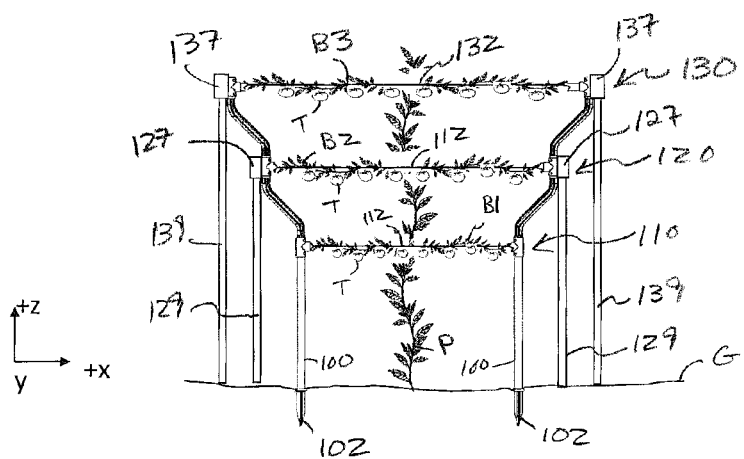
Figure 13:
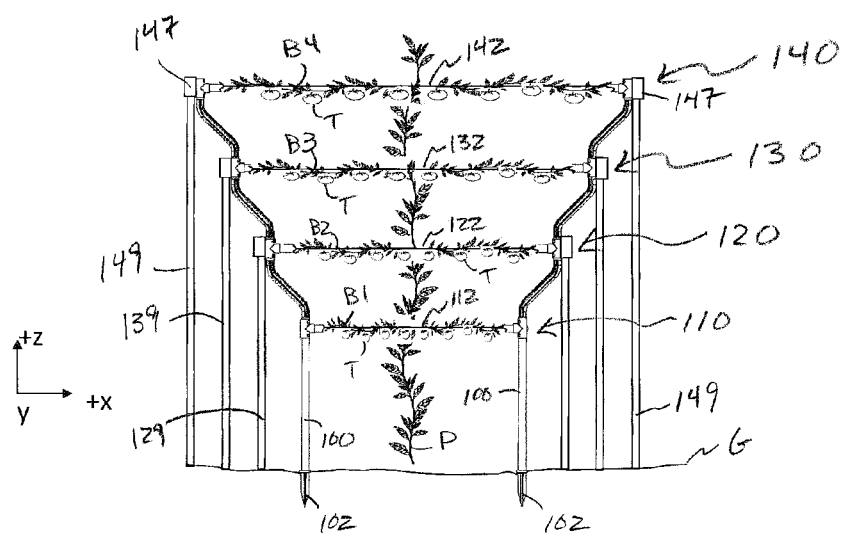
Figure 14:
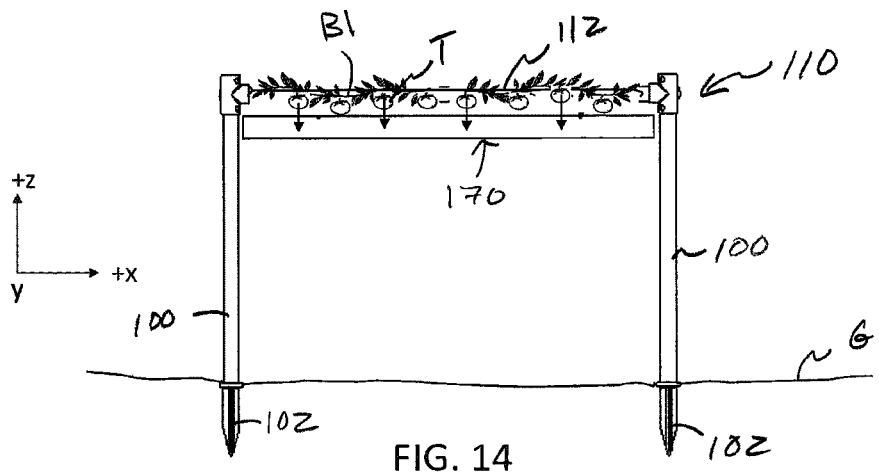
Figure 15:
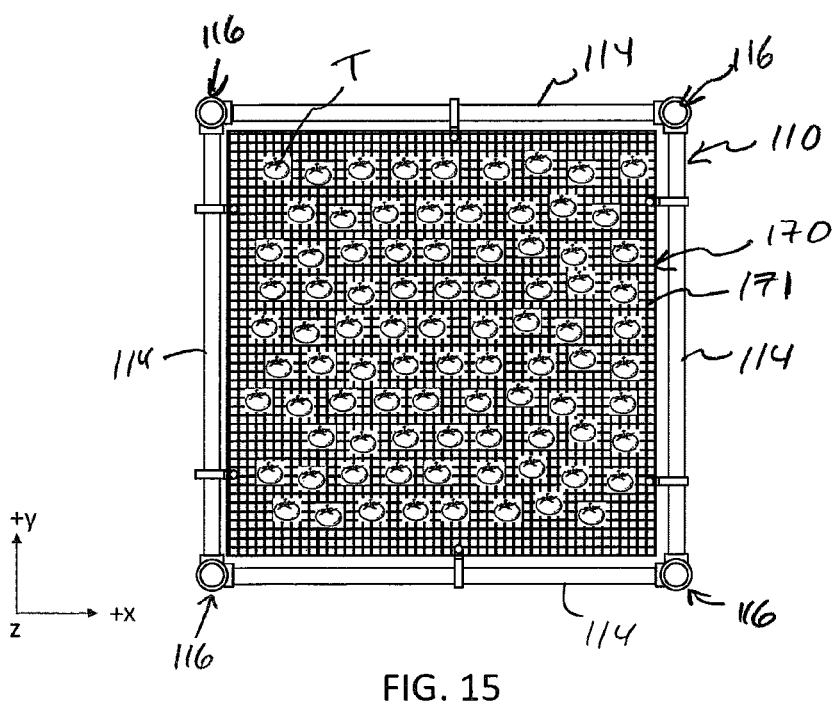
Figure 16:
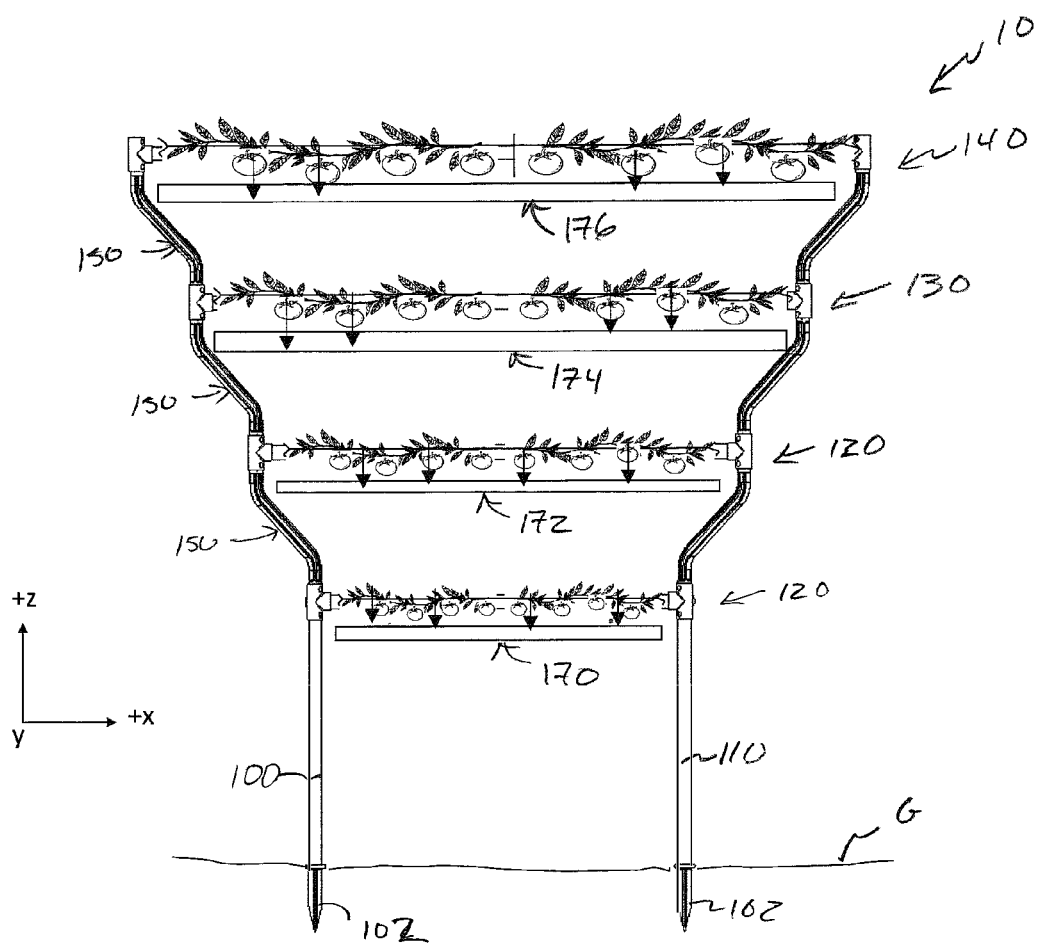
Figure 17:
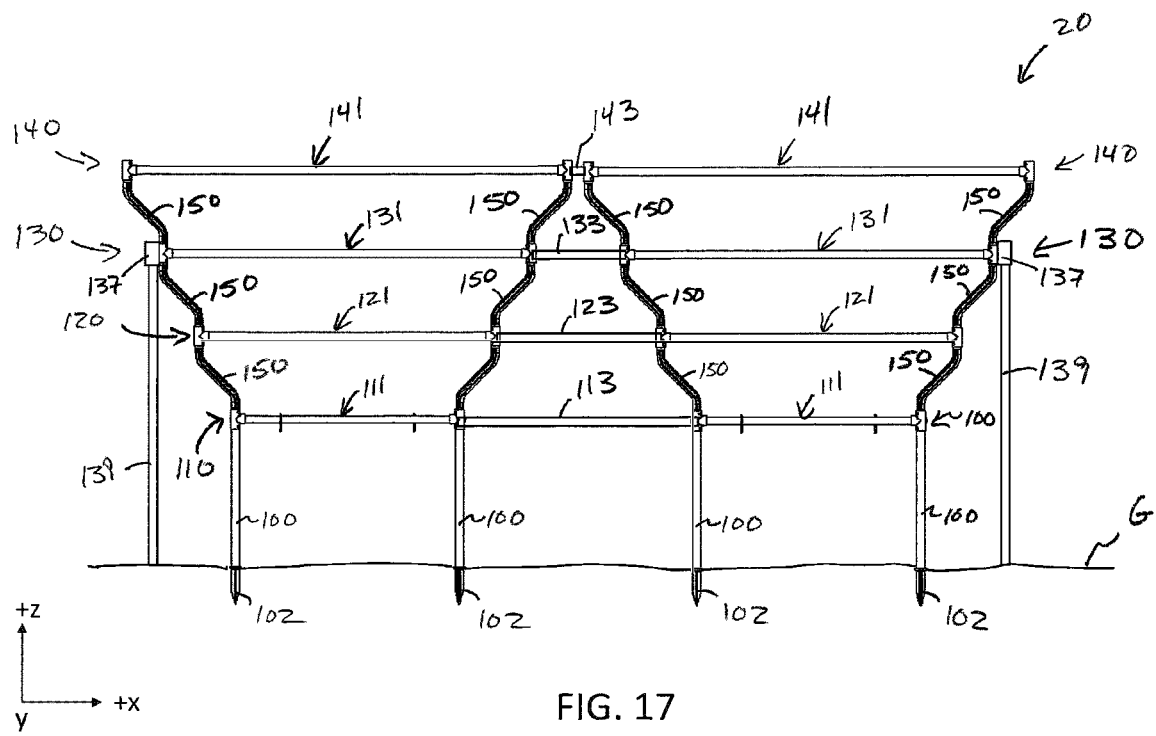
Figure 18:
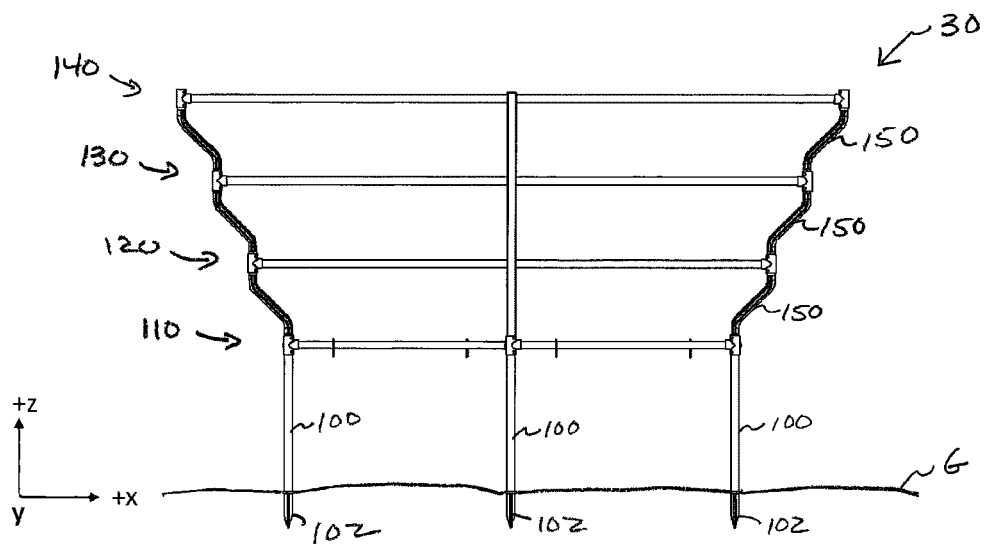

In order that the disclosure may be well understood, there will now be described various forms thereof, given by way of example, reference being made to the accompanying drawings, in which:

FIG. 1 schematically depicts a perspective view of a plant growing aid according to the teachings of the present disclosure;

FIG. 2 schematically depicts a side view of the plant growing aid in FIG. 1;

FIG. 3 schematically depicts a partial exploded perspective view of a first tier of a plant growing aid according to the teachings of the present disclosure;

FIG. 4 schematically depicts a side view of a first tier of a plant growing aid according to the teachings of the present disclosure;

FIG. 5 schematically depicts a top view of the first tier of the plant growing aid in FIG. 4;

FIG. 6 schematically depicts a plant growing through the first tier of the plant growing aid in FIGS. 4 and 5;

FIG. 7 schematically depicts the plant in FIG. 6 growing above the first tier of the plant growing aid according to the teachings of the present disclosure;

FIG. 8 schematically depicts a top view the plant in FIG. 7 growing above the first tier of the plant growing aid;

FIG. 9 schematically depicts a partial exploded perspective view of a second tier of a plant growing aid according to the teachings of the present disclosure;

FIG. 10 schematically depicts a top view of a second tier attached to the first tier in FIGS. 7 and 8 according to the teachings of the present disclosure;

FIG. 11 schematically depicts a side view of the plant in FIG. 7 growing above a second tier of the plant growing aid according to the teachings of the present disclosure;

FIG. 12 schematically depicts a side view of the plant in FIG. 7 growing above a third tier of the plant growing aid according to the teachings of the present disclosure;

FIG. 13 schematically depicts a side view of the plant in FIG. 7 growing above a fourth tier of the plant growing aid according to the teachings of the present disclosure;

FIG. 14 schematically depicts a side view of a harvesting shelf attached to a base frame of a plant growing aid according to the teachings of the present disclosure;

FIG. 15 schematically depicts a top view of the harvesting shelf in FIG. 14;

FIG. 16 schematically depicts a side view of harvesting shelves attached to frames of a plant growing aid according to the teachings of the present disclosure;

FIG. 17 schematically depicts a modular structure plant growing aid according to the teachings of the present disclosure; and FIG. 18 schematically depicts another modular structure plant growing aid according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Referring now to FIGS. 1 and 2, a perspective view and a side view, respectively, of a multi-tiered plant growing aid 10 are schematically depicted. The multi-tiered plant growing aid 10 (also referred to herein simply as a "growing aid") includes a plurality of base legs 100 and plurality of growing shelves 110, 120, etc. In some aspects of the present disclosure, a stake 102 is included and is attached to and extends from a lower end (−z direction) of the base legs 100. The stakes 102 are configured to be inserted into the ground 'G' (also referred to herein as "base surface") and/or potted soil such that the base legs 100 and the growing aid 10 are firmly supported and attached to the ground G. Positioned between the plurality of growing shelves 110, 120, etc., are a plurality of support legs 150 that position and space apart the growing shelves 110, 120, etc., relative to each other. As shown in FIGS. 1 and 2, in some aspects of the present disclosure the growing aid 10 includes a first growing shelf 110 (also referred to herein as a "base growing shelf") comprising a frame 111 formed from tubes 114, a second growing shelf 120 comprising a frame 121 formed from tubes 124, a third growing shelf 130 comprising a frame 131 formed from tubes 134, and a fourth growing shelf 140 comprising a frame 141 formed from tubes 144. It should be understood however that growing aids with less two, three or more than four growing shelves are included within the teachings of the present disclosure. In some aspects of the present disclosure, each subsequent growing shelf is larger (x and y directions shown in the figures) than the previous growing shelf. For example, and as shown in FIGS. 1 and 2, the second shelf 120 is larger (x and y directions) than the first shelf 110, the third shelf 130 is larger than the second shelf 120, and the fourth shelf 140 is larger than the third shelf 130. Accordingly, the growing aid 10 includes a plurality of cascading mesh panels with increasing outer dimensions as a function of increasing distance from the ground G. Non-limiting examples of shelf sizes include a 3 feet (ft or ') by 3' (x-y plane) first shelf 110, a 4' by 4' second shelf 120, a 5' by 5' third shelf, and a 6' by 6' fourth shelf 140. Also, non-limiting examples of the distance between (z direction) the first shelf 110 and the second shelf 120, between the second shelf 120 and the third shelf 130, and/or between the third shelf 130 and the fourth shelf 140 are 0.5', 1.0', 1.5', 2.0', and the like. Also, the first shelf 110 can be any distance above (z direction) above the base surface G, for example, 1', 2', 3', 4', etc., above the base surface G.

Referring now to FIG. 3, an exploded perspective view of a corner section of the first growing shelf 110 is schematically depicted. Particularly, each corner of the first growing shelf 110 includes a base leg 100 attached to at least one tube 114 configured to support a first mesh panel 112 (also referred to herein as a "base mesh panel"). Non-limiting examples of the size of the openings in the first mesh panel 112, and other mesh panels disclosed herein include 1 inch (in or ") openings (round, square, rectangular, etc.), 2" openings, 3" openings, 4" openings, and the like. In some aspects of the present disclosure, the at least one tube 114 is attached to the base leg 100 via a coupling 116 comprising at least one tube coupling member 117 and at least one leg coupling member 118. For example, the coupling 116 shown in FIG. 3 includes a pair of tube coupling members 117 with apertures (not labeled) configured for ends (not labeled) of a pair of tubes 114 to be inserted. The coupling 116 also has a lower (−z direction) leg coupling member 118 with an aperture (not labeled) configured for an upper (+z direction) end of the base leg 100 to be inserted. Inserting the ends of the tubes 114 into the tube coupling members 117 and inserting the upper end of the base leg 100 into the lower leg coupling member 118 for each of the corners of the first growing shelf 110 provide a frame 111. In some aspects of the present disclosure, the base legs 100 and/or the tubes 114 comprise a button 104 (not shown on tubes 114) and the coupling 116 comprises a corresponding button aperture 119. In such aspects the button 104 can be a spring load button and the button aperture 119 is dimensioned for the button 104 to fit at least partially therein. Accordingly, the end of a base leg 100 and/or tube 114 with a button 104 can be "snapped" into engagement with a leg coupling member 118 and/or a tube coupling member 117, respectively, when the button 104 aligns with the button aperture 119. In other aspects of the present disclosure, elongated pins, rods, screws, bolts, and the like (not shown) are provided and the base legs 100 and/or the tubes 114 comprise pin apertures (not shown). In such aspects, the elongated pins, rods, screws, bolts and the like are disposed within the pin apertures of the base legs 100 and/or the tubes 114 and disposed within the button apertures 119 of the coupling 116 such that ends of the tubes 114 are coupled to the tube coupling members 117 and the upper end of the base leg 100 is coupled to the lower leg coupling member 118 for each of the corners of the first growing shelf 110. FIGS. 4 and 5 schematically depict a side view and a top view of the assembled first growing shelf 110.

While FIG. 3 schematically depicts the base legs 100 and tubes 114 as cylindrical tubes and the coupling 116 comprising circular apertures, it should be understood that other shaped legs, tubes and couplings can be used to form the frame 111 and other frames disclosed herein. Non-limiting examples of legs and tubes include square shaped tubing, hexagonal shaped tubing, and the like.

In some aspects of the present disclosure, the first mesh panel 112 is supported by the frame 111 at a desired distance above the ground G. For example, a plurality of mesh panel clips 160 can be included and be attached to the tubes 114 via ring 162 as shown in FIG. 3 such that the first mesh panel 112 is engaged by j-shaped hooks 164 and thereby supported by the mesh panel clips 160 and the frame 111. Accordingly, the first growing shelf 110 is assembled by attaching or coupling the tubes 114 together to form the frame 111. Also, the frame 111 and the first mesh panel 112 are supported above (+z direction) a surface (e.g., the ground G) at a desired height (z direction) by the base legs 100. While FIG. 3 schematically depicts the mesh panel clips 160 as j-hook clips, it should be understood that other types of clips that attach the first mesh panel 112, and other panels disclosed herein, can be used. Non-limiting examples of mesh panel clips include shower curtain clips, carabiner clips, zip tie clips, and the like.

Referring now to FIG. 6, an exploded perspective view of a corner section of the second growing shelf 120 being assembled and attached to the first growing shelf 110 is schematically depicted. Particularly, each corner of the second growing shelf 120 includes a support leg 150 attached to at least one tube 124 configured to support a second mesh panel 122. In some aspects of the present disclosure, the at least one tube 124 is attached to the support leg 150 via a coupling 126 comprising at least one tube coupling member 127 and at least one leg coupling member 128. For example, the coupling 126 shown in FIG. 6 includes a pair of tube coupling members 127 with apertures (not labeled) configured for ends (not labeled) of a pair of tubes 124 to be inserted and a lower (−z direction) leg coupling member 128 with an aperture (not labeled) configured for an upper (+z direction) end of the support leg 150 to be inserted. Also, the upper leg coupling member 118 of the coupling 116 is configured for a lower end 152 of the support leg 150 to be inserted. In some aspects of the present disclosure, the coupling 126 is the same (i.e., the same shape and size) as the coupling 116. In other aspects of the present disclosure, the coupling 126 is not the same as the coupling 116.

Inserting the ends of the tubes 124 into the tube coupling members 127 and inserting the upper end 154 of the support leg 150 into the lower leg coupling member 128 for each of the corners of the second growing shelf 120 provide a frame 121 (FIG. 2). In some aspects of the present disclosure, the second mesh panel 122 is supported by the frame 121 at a desired distance above (+z direction) above the first mesh panel 112. For example, a plurality of mesh panel clips (not shown) can be included and be attached to the tubes 124 such that the second mesh panel 122 is engaged and supported by the mesh panel clips and the frame 121. Accordingly, the second growing shelf 120 is assembled by attaching or coupling the tubes 124 together to form the frame 121.

Also, the frame 121 and the first mesh panel 122 are supported above (+z direction) the first mesh panel 112 at a desired height (z direction) by the support legs 150.

Still referring to FIG. 6, and similar to the second growing shelf 120, the third growing shelf 130 is assembled by attaching or coupling tubes 134 together to form a frame 131 (FIG. 2). The frame in combination with support legs 150 supports a third mesh panel 132 above the second mesh panel 122. Also, the fourth growing shelf 140 is assembled by attaching or coupling tubes 144 together to form a frame 141 (FIG. 2). The frame in combination with support legs 150 supports a fourth mesh panel 132 above the third mesh panel 132. Accordingly, FIG. 6 schematically depicts a kit 20 of parts (i.e., base legs, tubes, couplings, mesh panels, support legs, mesh panel clips, etc.) being assembled to form the multi-tiered growing aid 10.

Referring now to FIGS. 7 through 13, use of the multi-tiered growing aid 10 and a method of growing a plant are schematically depicted. Particularly, FIG. 7 schematically depicts the first growing shelf 110 assembled and supported above the ground G. A plant P, for example a tomato plant, with a stem S and leaves L is schematically depicted growing from the ground G up (+z direction) to the first mesh panel 112. As the plant P continues to grow through the first mesh panel 112, the stem S and or a first set of branches B1 of the plant P are pushed down into and intertwined with the first mesh panel 112 such that the stem S and/or branches B1 grow laterally (x direction) and within the first mesh panel as schematically depicted in FIG. 8. The plant continues to grow until most or generally all of the surface area of the first mesh panel 112 is covered by the stem S, branches B1 and/or leaves L of the plant P as schematically depicted in FIG. 9. In this manner flowering (and growth of tomatoes) of the plant is enhanced along horizontal directions (x, y directions), i.e., along the first growing shelf 110.

Referring now to FIG. 10, after a desired amount of growth of the plant P on the first growing shelf 110 has occurred, the second growing shelf 120 is assembled and attached to the first growing shelf 110. In the alternative, the second growing shelf 120 is assembled before a desired amount of growth of the plant P on the first growing shelf 110 has occurred. That is, the second growing shelf 120, the third growing shelf 130, and/or the fourth growing shelf 140 can be assembled and attached above the first growing shelf 110 any time before or after the plant P has started to grow.

Referring now to FIG. 11, the plant P grows up (+z direction) to and through the second mesh panel 122. Similar to the growth of the plant P above the first mesh panel 112, the stem S and/or a second set of branches B2 are pushed down into and intertwined with the second mesh panel 122 such that the stem S and/or branches B2 grow laterally (x direction) and within the second mesh panel 122 as schematically depicted in FIG. 11. The plant continues to grow until most or generally all of the surface area of the second mesh panel 122 is covered by the stem S, branches B1 and/or leaves L of the plant P. In this manner flowering (and growth of tomatoes) of the plant is enhanced along horizontal directions (x, y directions), i.e., along the second growing shelf 120. It should be understood from the drawings that the growth area (i.e., the area for the plant P to grow laterally) for the plant P on the second growing shelf 120 is greater than the growth area for the plant P on the first growing shelf 110. Also, in some aspects of the present disclosure, the second growing shelf 120 is additionally supported by a plurality of second shelf legs 129 as schematically depicted in FIG. 11. For example, a plurality of second shelf support legs 129, with or without stakes 102, can be attached to the second growing shelf 120 and extend from the second growing shelf 120 to the ground G. In some aspects each of the second shelf legs 129 is attached to a coupling member 127 that is attached to the coupling 126 (FIG. 6). In other aspects each of the second shelf legs 129 is attached directly to the coupling 126 (not shown) or directly to the support legs 150. It should be understood that the second shelf legs 129 increase the stability of the second growing shelf 120 as flowering (and growth of tomatoes) of the plant P is enhanced along the second growing shelf 120.

Referring now to FIG. 12, the plant P grows up (+z direction) to and through the third mesh panel 132. Similar to the growth of the plant P above the first mesh panel 112 and the second panel 122, the stem S and/or a third set of branches B3 are pushed down into and intertwined with the third mesh panel 132 such that the stem S and/or branches B3 grow laterally (x direction) and within the third mesh panel 132 as schematically depicted in FIG. 12. The plant continues to grow until most or generally all of the surface area of the third mesh panel 132 is covered by the stem S, branches B3 and/or leaves L of the plant P. In this manner flowering (and growth of tomatoes) of the plant is enhanced along horizontal directions (x, y directions), i.e., along the third growing shelf 130. It should be understood from the drawings that the growth area (i.e., the area for the plant P to grow laterally) for the plant P on the third growing shelf 130 is greater than the growth area for the plant P on the second growing shelf 120. Also, in some aspects of the present disclosure, the third growing shelf 130 is additionally supported by a plurality of third shelf legs 139 as schematically depicted in FIG. 12. For example, a plurality of third shelf support legs 139, with or without stakes 102, can be attached to the third growing shelf 130 and extend from the third growing shelf 130 to the ground G. In some aspects each of the third shelf legs 139 is attached to a coupling member 137 that is attached to the coupling 136 (FIG. 6). In other aspects each of the third shelf legs 139 is attached directly to the coupling 136 (not shown) or directly to the support legs 150. It should be understood that the third shelf legs 139 increase the stability of the third growing shelf 130 as flowering (and growth of tomatoes) of the plant P is enhanced along the third growing shelf 130.

Referring now to FIG. 13, the plant P grows up (+z direction) to and through the fourth mesh panel 142. Similar to the growth of the plant P above the first mesh panel 112, the second mesh panel 122, and the third mesh panel 132, the stem S and/or a fourth set of branches B4 are pushed down into and intertwined with the fourth mesh panel 142 such that the stem S and/or branches B4 grow laterally (x direction) and within the fourth mesh panel 142 as schematically depicted in FIG. 13. The plant continues to grow until most or generally all of the surface area of the fourth mesh panel 142 is covered by the stem S, branches B4 and/or leaves L of the plant P. In this manner flowering (and growth of tomatoes) of the plant is enhanced along horizontal directions (x, y directions), i.e., along the fourth growing shelf 140. It should be understood from the drawings that the growth area (i.e., the area for the plant P to grow laterally) for the plant P on the fourth growing shelf 140 is greater than the growth area for the plant P on the third growing shelf 140. Also, in some aspects of the present disclosure, the fourth growing shelf 140 is additionally supported by a plurality of fourth shelf legs 149 as schematically depicted in FIG. 13. For example, a plurality of fourth shelf support legs 149, with or without stakes 102, can be attached to the fourth growing shelf 140 and extend from the fourth growing shelf 140 to the ground G. In some aspects each of the fourth shelf legs 149 is attached to a coupling member 147 that is attached to the coupling 146 (FIG. 6). In other aspects each of the fourth shelf legs 149 is attached directly to the coupling 146 (not shown) or directly to the support legs 150. It should be understood that the fourth shelf legs 149 increase the stability of the fourth growing shelf 140 as flowering (and growth of tomatoes) of the plant P is enhanced along the fourth growing shelf 140.

Accordingly, the growing aid 10 increases the production of tomatoes with each growing shelf. Also, the base legs 100, frames 111, 121, 131, 141, and support legs 150 provide structural stability such that support is provided to the increased growth and vegetation of the plant P within and along each growing shelf 110, 120, 130, 140 respectively.

While FIGS. 11-13 depict each of the second, third and fourth growing shelves 120, 130, 140 additionally supported by the second, third, and fourth shelf legs 129, 139, 149, respectively, it should be understood that not all of the cascaded growing shelves must be additionally supported. That is, and with reference to FIGS. 11-13, the second growing shelf 120, the third growing shelf 130 and/or the fourth growing shelf 140 may be additionally supported with the second shelf legs 129, third shelf legs 139 and/or fourth shelf legs 149, respectively.

Referring now to FIGS. 14 and 15, harvesting of the tomatoes T is schematically depicted. Particularly, a harvesting shelf 170 is attached and supported below the first mesh panel 112 and the tomatoes T are severed from the branches and allowed to fall or placed into the harvesting shelf 170. In some aspect of the present disclosure, the harvesting shelf 170 has a screen 171 that supports the tomatoes T and allows water to pass therethrough such that the tomatoes can be washed in the harvesting shelf 170, dried in the harvesting shelf 170, etc. The harvesting shelf 170 with the tomatoes T can be removed, or in the alternative left to remain under the first mesh panel while the tomatoes are cleaned (e.g., washed) and allowed to dry. It should be understood that additional harvesting shelves 172, 174, 176 can be attached and supported below the second mesh panel 122, third mesh panel 132 and fourth mesh panel 142, respectively, as schematically depicted in FIG. 16. Accordingly, the growing aid 10 has dual functionality, i.e., in some aspects of the present disclosure, the growing aid 10 serves as a structure for enhancing the growth of the plant 10. In the alternative, or in addition to, the growing aid serves as a holding and/or cleaning structure for harvesting of the plant P.

Referring now to FIG. 17, a growing aid 20 comprising a modular structure of growing shelves is schematically depicted. Particularly, the growing aid 20 includes two first growing shelves 110, two second growing shelves 120, two third growing shelves 130, and two fourth growing shelves 140 coupled to each other via spacer 113, 123, 133, 143 tubes such that a 2 by 1 (i.e., two growing assemblies long by one growing assembly wide) modular structure growing aid is provided. In some aspects of the present disclosure, at least one set of shelf legs are included to support at least one of the growing shelves. For example, and as shown in FIG. 17, at least one third shelf leg is attached to the third growing shelf 130 and extends from the third growing shelf 130 to the ground G. In some aspects each of the third shelf legs 139 is attached to the coupling member 137 that is attached to the coupling 136 (FIG. 6). In other aspects each of the third shelf legs 139 is attached directly to the coupling 136 (not shown) or directly to the support legs 150. It should be understood that other modular assemblies (e.g., 3 by 1, 2 by 2, etc.) are provided and disclosed according to the teachings of the present disclosure.

Referring now to FIG. 18, a growing aid 30 comprising another modular structure of growing shelves is schematically depicted. As shown in FIG. 18, two first growing shelves 110 are positioned directly next to and attached to each other, and the two second growing shelves 120, two third growing shelves 130 and two fourth growing shelves 140 are modified (e.g., reduced in the x direction) to form a 2 by 1 modular structure growing aid. It should be understood that other modular assemblies (e.g., 3 by 1, 2 by 2, etc.) are provided and disclosed according to the teachings of the present disclosure.

When an element or layer is referred to as being "on," "engaged to," or "coupled to," another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spacially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A multi-tiered plant growing aid comprising:
   a base frame comprising a plurality of base frame tubes, and a base mesh panel attached to the base frame;
   at least one additional frame and at least one additional mesh panel attached to the at least one additional frame;
   a plurality of base legs, a plurality of S-shaped support legs, a first set of releasably attachable couplings, and a second set of releasably attachable couplings, wherein:
      each of the first set of releasably attached couplings comprises a pair of tube coupling members with apertures configured for ends of a pair of the plurality of base frame tubes to be inserted, a lower leg coupling member with an aperture configured for an end of one of the base legs to be inserted, and an upper leg coupling member with an aperture configured for an end of one of the S-shaped support legs to be inserted such that the first set of releasably attachable couplings are positioned between and releasably attached to the base frame and the plurality of base legs,
      the second set of releasably attachable couplings are positioned between and releasably attached to the plurality of S-shaped support legs and the at least one additional frame such that the at least one additional frame is positioned parallel and spaced apart from the base frame, the at least one additional mesh panel is positioned parallel and spaced from the base mesh panel, and a plurality of cascading mesh panels with increasing outer dimensions as a function of distance from the base surface is formed.

2. The multi-tiered plant growing aid according to claim 1, wherein the base mesh panel and the at least one additional mesh panel are configured for stems of a plant to grow vertically therethrough and branches of the plant to grow horizontally thereon.

3. The multi-tiered plant growing aid according to claim 1 further comprising a plurality of mesh panel clips releasably attaching the base mesh panel to the base frame and the at least one additional mesh panel to the at least one additional frame.

4. The multi-tiered plant growing aid according to claim 1 further comprising a plurality of shelf legs configured to attach to and extend from the at least one additional frame to the base surface.

5. A kit of parts for a multi-tiered plant growing aid, the kit comprising:
   a base frame comprising a plurality of base frame tubes, a plurality of base legs and a first set of couplings attachable to the base frame and the plurality of base legs such that the base frame is configured to be supported by and spaced apart from a base surface by the plurality of base legs, wherein each of the first set of releasably attached couplings comprises a pair of tube coupling members with apertures configured for ends of a pair of the plurality of base frame tubes to be inserted, a lower leg coupling member with an aperture configured for an end of one of the base legs to be inserted, and an upper leg coupling member with an aperture configured for an end of one of the support legs to be inserted;
   at least one additional frame a plurality of S-shaped support legs, and a second set of couplings attachable to the at least one additional frame and the plurality of S-shaped support legs, wherein the plurality of S-shaped support legs are attachable to the first set of couplings such that the at least one additional frame is positioned parallel to and spaced apart from the base frame, wherein the at least one additional frame has an outer dimension greater than an outer dimension of the base frame; and
   a base mesh panel attachable to the base frame and at least one additional mesh panel attachable to the at least one additional frame such that the at least one additional mesh panel is configured to be positioned parallel to and spaced apart from the base mesh panel and a plurality of cascading mesh panels with increasing outer dimensions as a function of distance from the base surface is formed.

6. The kit according to claim 5 further comprising a first set of mesh panel clips configured to attach the base mesh panel to the base frame and a second set of mesh panel clips configured to attach the at least one additional mesh panel to the at least one additional frame.

7. The kit according to claim 5 further comprising a plurality of shelf legs configured to attach to and extend from the at least one additional frame to the base surface.

* * * * *